(12) United States Patent
Akai et al.

(10) Patent No.: US 11,713,016 B2
(45) Date of Patent: Aug. 1, 2023

(54) VEHICLE SEAT

(71) Applicant: TS TECH CO., LTD., Saitama (JP)

(72) Inventors: Kota Akai, Tochigi (JP); Masahiro Okabe, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 0 days.

(21) Appl. No.: 17/670,928

(22) Filed: Feb. 14, 2022

(65) Prior Publication Data

US 2022/0169197 A1 Jun. 2, 2022

Related U.S. Application Data

(63) Continuation of application No. 16/498,150, filed as application No. PCT/JP2017/035084 on Sep. 28, 2017, now Pat. No. 11,279,312.

(30) Foreign Application Priority Data

Mar. 31, 2017 (JP) ................................ 2017-072099

(51) Int. Cl.
  *B60R 21/2165* (2011.01)
  *B60N 2/64* (2006.01)
  (Continued)

(52) U.S. Cl.
  CPC ............ *B60R 21/2165* (2013.01); *B60N 2/64* (2013.01); *B60N 2/68* (2013.01); *B60N 2/70* (2013.01);
  (Continued)

(58) Field of Classification Search
  CPC .............. B60R 21/2165; B60R 21/207; B60R 21/23138; B60R 2021/23146;
  (Continued)

(56) References Cited

U.S. PATENT DOCUMENTS 5,636,862 A 6/1997 Cheung et al.
5,639,111 A 6/1997 Spencer et al.
(Continued)

FOREIGN PATENT DOCUMENTS

| JP | 2011068198 | 4/2011 |
|----|------------|--------|
| JP | 2011121511 | 6/2011 |

(Continued)

OTHER PUBLICATIONS

International Search Report for PCT/JP2017/035084 dated Dec. 13, 2017, 2 pages.
(Continued)

*Primary Examiner* — Karen Beck
(74) *Attorney, Agent, or Firm* — Dority & Manning, PA

(57) ABSTRACT

In a vehicle seat comprising a seat cushion and a seatback, the seatback comprises a seatback frame including a right and a left side member extending vertically, a side airbag unit attached to one of the side members, a flexible seatback pad provided with a pad side slit to permit an airbag to be deployed opposite to the side airbag unit, a skin member having a skin side slit in a part thereof corresponding to the pad side slit, and a retaining sheet connected to a part of a back side of the seatback pad opposing the side member, and to the side member so as to fixedly secure a position of the seatback pad relative to the side member.

18 Claims, 6 Drawing Sheets

(51) Int. Cl.
  *B60R 21/207* (2006.01)
  *B60R 21/231* (2011.01)
  *B60N 2/68* (2006.01)
  *B60N 2/70* (2006.01)

(52) U.S. Cl.
  CPC ...... *B60R 21/207* (2013.01); *B60R 21/23138* (2013.01); *B60R 2021/23146* (2013.01)

(58) Field of Classification Search
  CPC . B60R 21/2171; B60R 2021/161; B60N 2/64; B60N 2/68; B60N 2002/5808; B60N 2/5825; B60N 2/643; B60N 2/646
  See application file for complete search history.

(56) References Cited

U.S. PATENT DOCUMENTS

| | | | |
|---|---|---|---|
| 6,439,597 B1 * | 8/2002 | Harada | B60R 21/207 |
| | | | 280/730.2 |
| 8,833,852 B2 | 9/2014 | Festag | |
| 9,688,230 B2 | 6/2017 | Makita | |
| 9,738,197 B2 | 8/2017 | Tanabe et al. | |
| 10,000,176 B2 | 6/2018 | Buelow et al. | |
| 2002/0063452 A1 | 5/2002 | Harada et al. | |
| 2006/0131848 A1 | 6/2006 | Miyake et al. | |
| 2013/0187416 A1 | 7/2013 | Nakata | |
| 2014/0070595 A1 | 3/2014 | Taniguchi et al. | |
| 2014/0312664 A1 | 10/2014 | Tanabe et al. | |
| 2014/0375028 A1 | 12/2014 | Sahashi | |
| 2016/0114751 A1 | 4/2016 | Saito et al. | |
| 2016/0325646 A1 | 11/2016 | Tanabe et al. | |
| 2020/0391687 A1 | 12/2020 | Negishi et al. | |
| 2021/0078518 A1 | 3/2021 | Tanabe et al. | |
| 2021/0107428 A1 | 4/2021 | Toba et al. | |

FOREIGN PATENT DOCUMENTS

| | | |
|---|---|---|
| JP | 2014076736 | 5/2014 |
| JP | 2016078463 | 5/2016 |
| JP | 2016107718 | 6/2016 |
| WO | WO2013137355 | 9/2013 |
| WO | WO2015080213 | 6/2015 |
| WO | WO2015108120 | 7/2015 |
| WO | WO2018179515 | 10/2018 |

OTHER PUBLICATIONS

Baba et al. WO 2015/108120 Machine Enelish Translation, ip.com (Year: 2015).

* cited by examiner

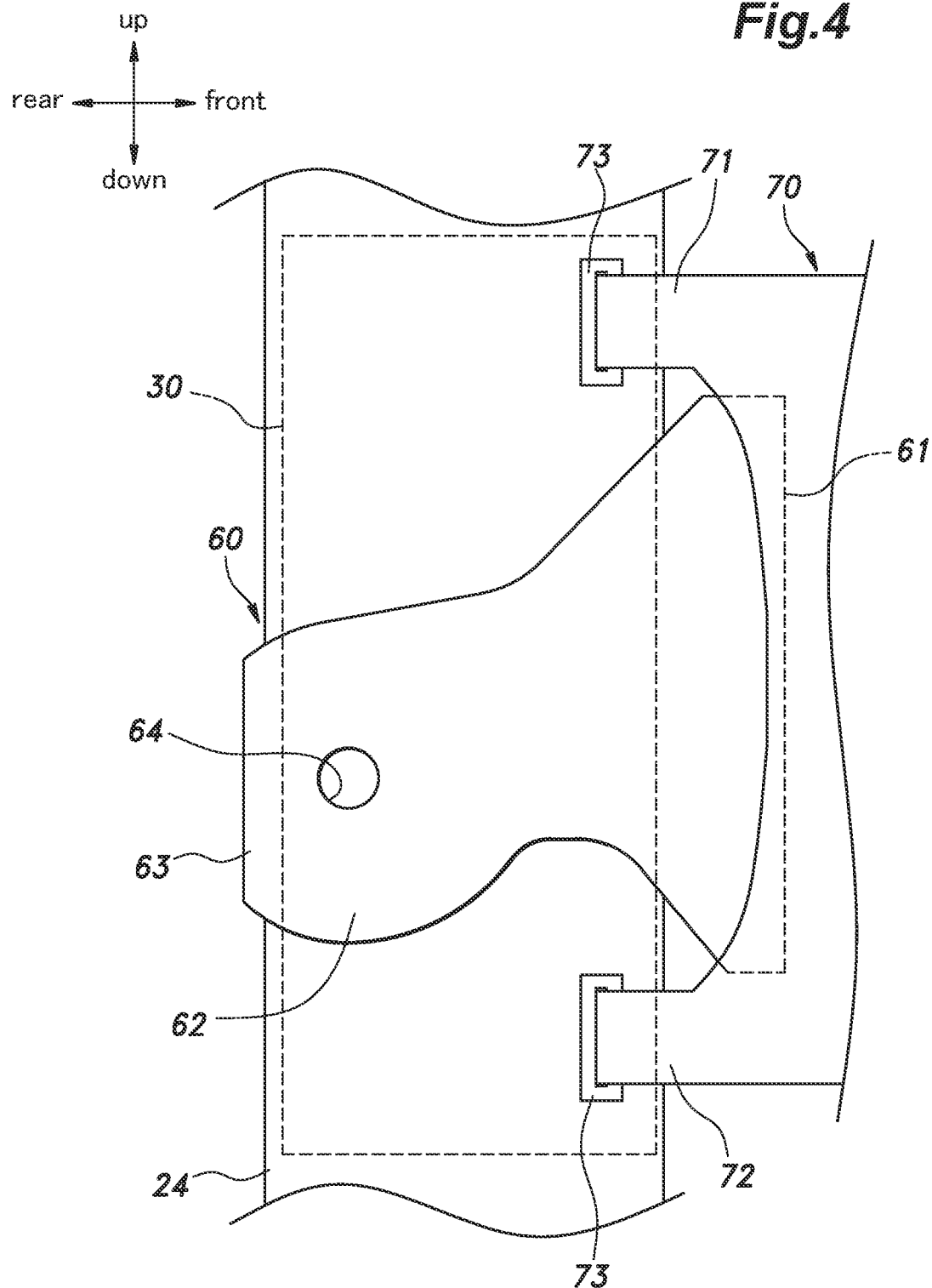

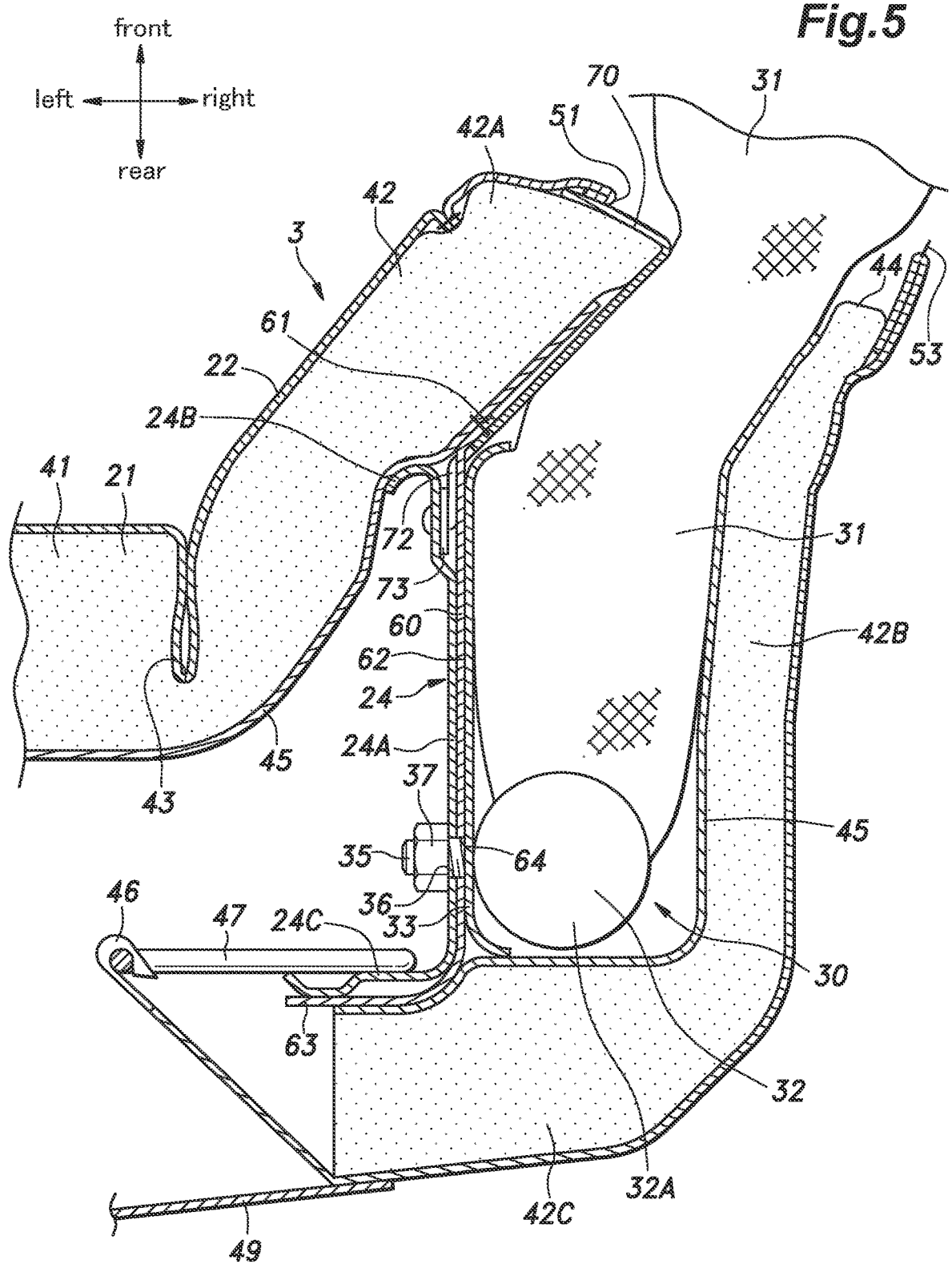

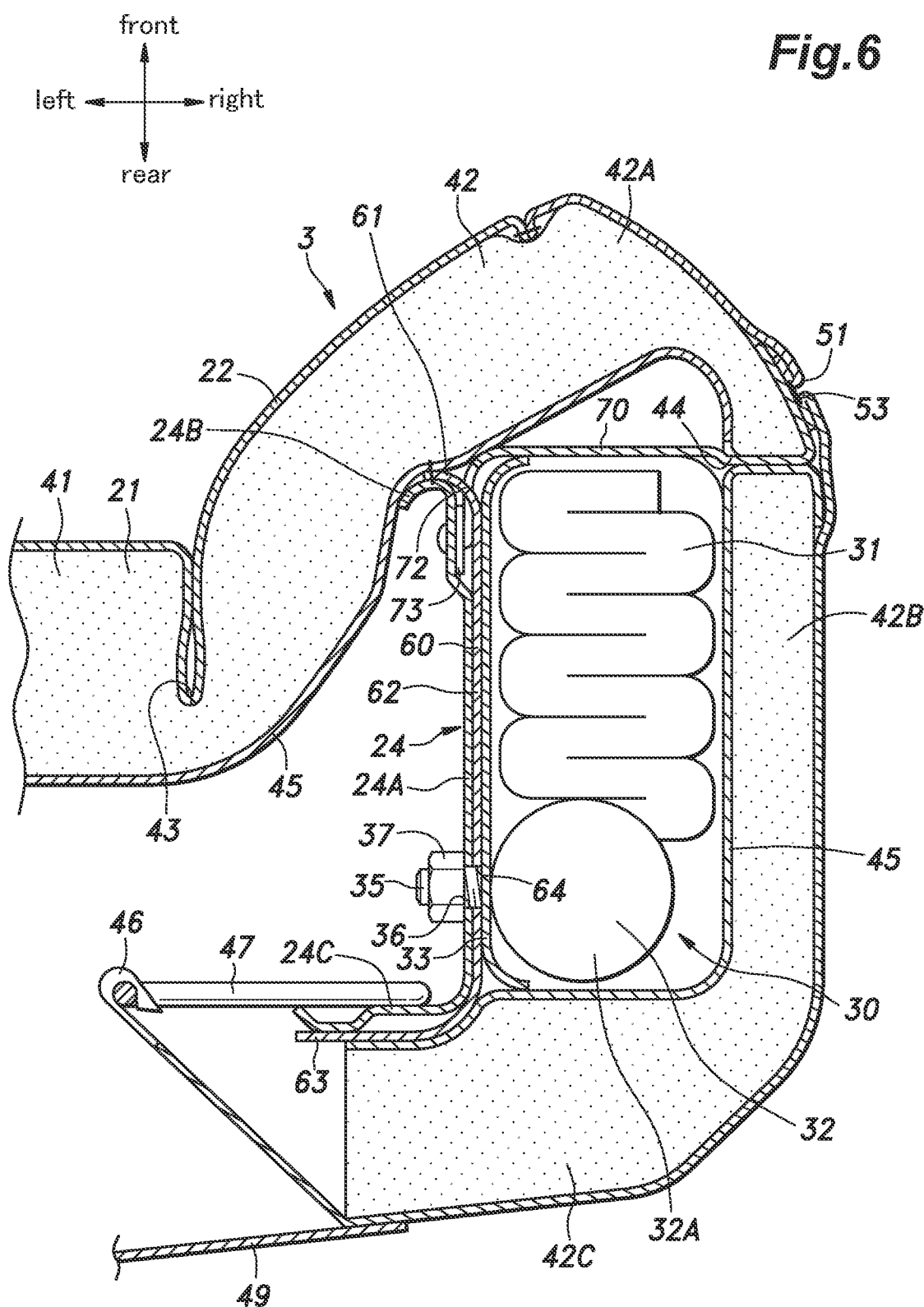

VEHICLE SEAT

CROSS REFERENCE TO RELATED APPLICATIONS

This application is a continuation of U.S. patent application Ser. No. 16/498,150, filed on Sep. 26, 2019, which is the U.S. National Stage entry of International Application No. PCT/JP2017/035084, filed under the Patent Cooperation Treaty on Sep. 28, 2017, which claims priority to Japanese Patent Application No. 2017-072099, filed on Mar. 31, 2017, all of which are incorporated herein by reference.

TECHNICAL FIELD

The present invention relates to a vehicle seat to be mounted on a vehicle.

BACKGROUND ART

In a known vehicle seat, a side airbag unit is incorporated in a seatback (for example, Patent Document 1). The vehicle seat disclosed in Patent Document 1 includes a seatback frame including a pair of side members extending vertically along either side of the seatback, a side airbag unit fastened to the outer surface of one of the side members, and a seatback pad covering the side members and the side airbag unit, and a skin member covering the seatback pad. An opening is passed through the seatback pad and the skin member to allow the side airbag deployed from the side airbag unit to pass through the opening. The opening in the skin member is normally closed by sewing, and the sewing thread is configured to be broken when the side airbag is deployed to allow the side airbag to pass through the opening.

PRIOR ART DOCUMENT(S)

Patent Document(s)

Patent Document 1: JP2016-78463A

SUMMARY OF THE INVENTION

Task to be Accomplished by the Invention

In the seat disclosed in Patent Document 1 mentioned above, the slit formed in the seatback pad impairs the shape retaining property of the seatback pad. As a result, when the occupant comes in contact with the seatback at the time of getting in and out of the vehicle, the seatback pad may shift relative to the seatback frame inside the skin member, and could be caught by the seatback frame in the permanently shifted state. As a result of the permanently shifted state of the seatback pad relative to the seatback frame, the seatback itself could be permanently deformed.

In view of the above background, an object of the present invention is to provide a vehicle seat having a slit for allowing a side airbag to pass through, in which a seatback pad is prevented from positionally shifting from a seatback frame.

Means for Accomplishing the Task

To achieve such an object, one embodiment of the present invention provides a vehicle seat (1) comprising a seat cushion (2) and a seatback (3), the seat comprising: a seatback frame (20) including a right and a left side member (24) extending vertically; a side airbag unit (30) attached to one of the side members; a flexible seatback pad (21) supported by the seatback frame and covering the side members and the side airbag unit, the seatback pad being provided with a pad side slit (44) passed through a part of the seatback pad opposing the side airbag unit in a thicknesswise direction and extending substantially in parallel with the side member to permit an airbag deployed from the side airbag unit to pass through; a skin member (22) covering an outer surface of the seatback pad and having a skin side slit (51) in a part thereof corresponding to the pad side slit; and a retaining sheet (60) connected to a part of a back side of the seatback pad opposing the side member, and to the side member so as to fixedly secure a position of the seatback pad relative to the side member.

According to this arrangement, since the retaining sheet fixedly secures the back surface of the seatback pad to the side member, positional shifting of the seatback pad with respect to the side member can be restricted. As a result, even when the seatback pad is temporarily deformed by the application of external force to the seatback, causing the pad side slit to be opened, the seatback pad is enabled to restore the original shape thereof, and the pad side slit is allowed to return to the original closed state once the external force is removed.

In the above invention, preferably, a back liner (45) is attached to the back side of the seatback pad, and the retaining sheet is sewn to the back liner.

According to this arrangement, the retaining sheet can be securely attached to the seatback pad.

In the above invention, preferably, the side airbag unit is provided on an outer side surface of the side member facing laterally outward, and the pad side slit is provided in a part of the seatback pad located laterally outward of the side member.

According to this arrangement, the side airbag can be deployed from the side of the seat to the outside.

In the above invention, preferably, the pad side slit opens at a laterally outer side surface of the seatback pad.

According to this arrangement, since the laterally outer side part of the seatback pad is unlikely to be deformed due to the load of the seated occupant, the pad side slit is prevented from inadvertently opening up.

In the above invention, preferably, the pad side slit is provided in a part of the seatback pad located ahead of the side member.

According to this arrangement, since the pad side slit is formed in a part of the seatback pad which is relatively remote from the side member, and relatively readily deformable, the slit can readily open up and allow the side airbag to be deployed in a smooth manner at the time of deploying the side airbag.

In the above invention, preferably, the retaining sheet is connected to a part of the seatback pad located ahead of a front edge of the side member.

According to this arrangement, the retaining sheet is enabled to fixedly secure the position of the front part of the seatback pad relative to the side frame.

In the above invention, preferably, the retaining sheet has a greater vertical width in a part thereof connected to the seatback pad than in a part thereof connected to the side member.

According to this arrangement, the retaining sheet can be attached to the seatback pad over a vertically extended region wide range so that the seatback pad can be supported over a wide region.

In the above invention, preferably, the retaining sheet is provided with a gripping portion (63) extending rearward from between the side member and the side airbag unit.

According to this arrangement, during the process of attaching the retaining sheet to the side member, the worker can grip the gripping portion to correctly position the retaining sheet so that the assembling process of the seatback is facilitated.

Effect of the Invention

According to the foregoing arrangement, in a vehicle seat having a slit for allowing a side airbag to pass through, a seatback pad is prevented from positionally shifting from a seatback frame.

BRIEF DESCRIPTION OF THE DRAWING(S)

FIG. 4 is a side view showing a retaining sheet;

FIG. 5 is a sectional view of the seatback when the side airbag is deployed; and FIG. 6 is a sectional view of the seatback according to a modified embodiment of the present invention.

DESCRIPTION OF THE PREFERRED EMBODIMENT(S)

One embodiment of the present invention is described in the following with reference to the appended drawings, in which a vehicle seat according to the present invention is embodied as a driver's seat of an automobile. In the following description, various directions will be based on the viewpoint of the occupant seated on the seat.

Figure 1:
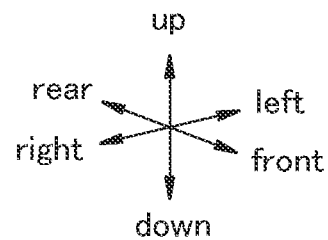
FIG. 1 is a perspective view of a vehicle seat according to an embodiment of the present invention as viewed from a front left direction.
Figure 1:
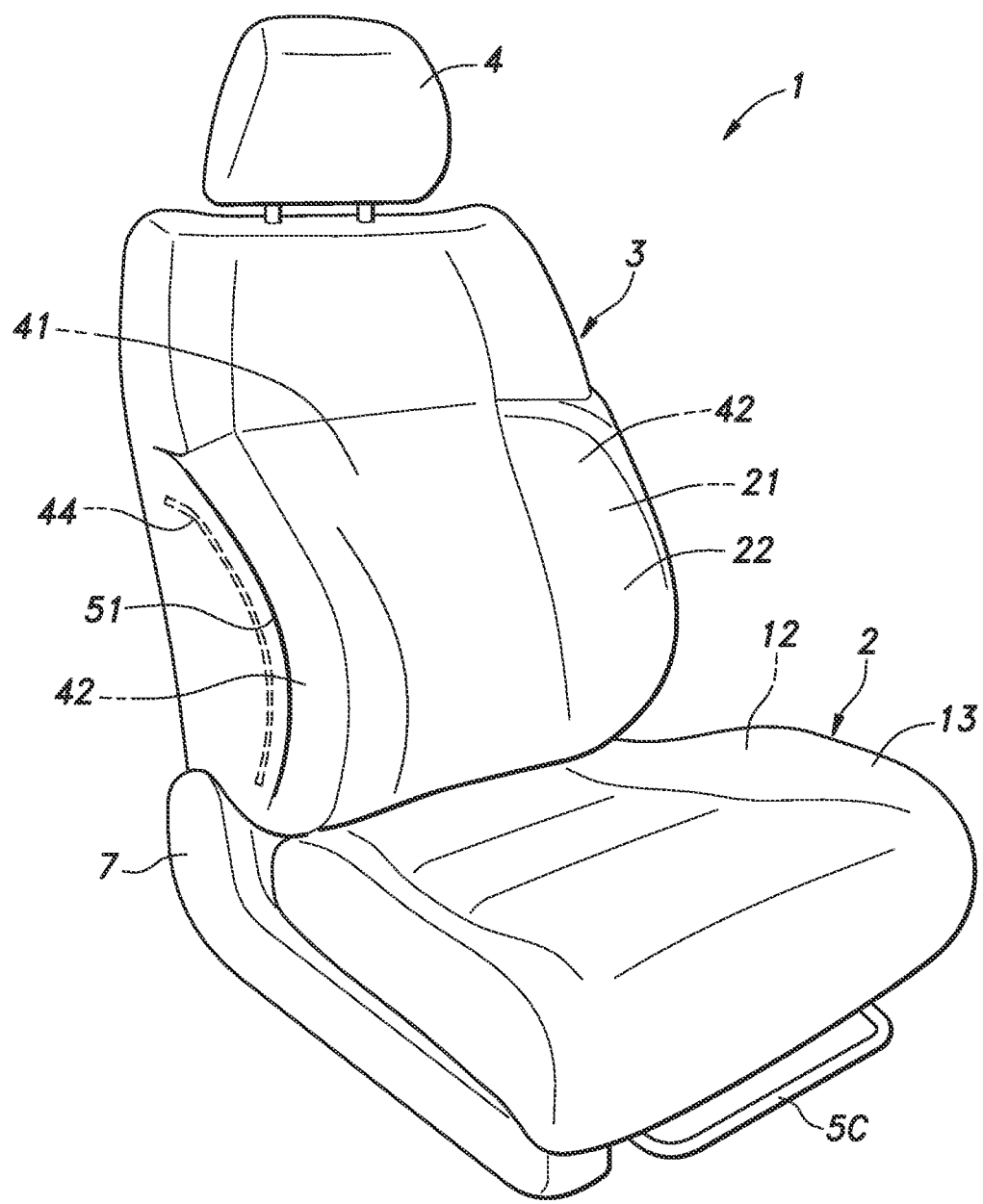
Figure 2:
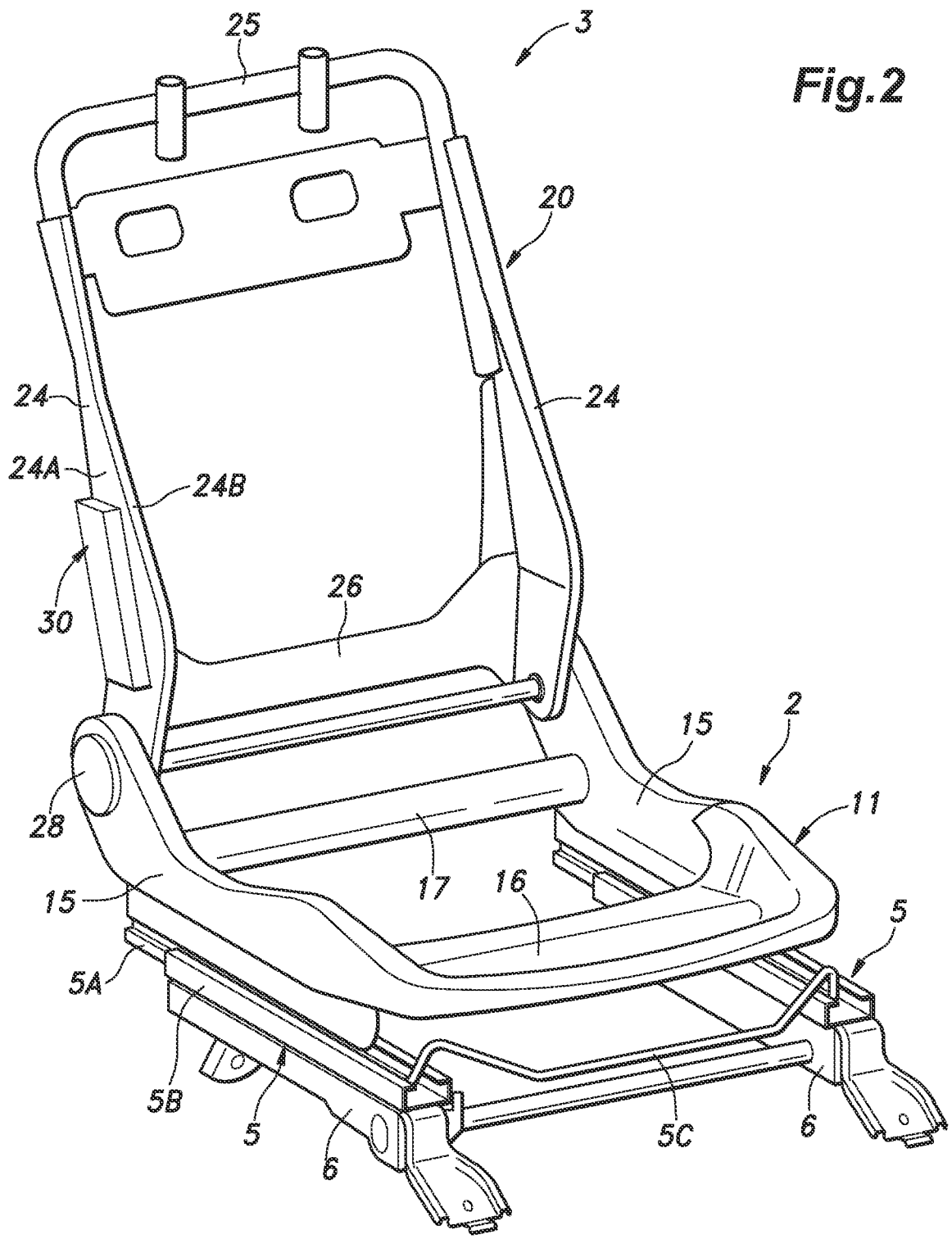
FIG. 2 is a perspective view of a frame of the vehicle seat as viewed from a front right direction.

As shown in FIGS. 1 and 2, the seat 1 includes a seat cushion 2, a seatback 3 rotatably connected to a rear end of the seat cushion 2, a headrest 4 connected to an upper end of the seatback 3, a pair of slide rails 5 provided in a lower part of the seat cushion 2 on either side of the seat cushion 2, and legs 6 connecting the slide rails 5 to the floor of the vehicle. A lower side part of the seat cushion 2 is covered by a cover member 7.

The seat cushion 2 includes a seat cushion frame 11 serving as a skeleton, a seat cushion pad 12 supported by the seat cushion frame 11, and a skin member 13 covering the outer surface of the seat cushion pad 12. The seat cushion frame 11 includes a pair of cushion side members 15 extending in the fore and aft direction, a front member 16 extending laterally and connected to the front ends of the cushion side members 15, and a rear member 17 extending laterally and connected to rear ends of the cushion side members 15.

Each slide rail 5 includes an upper rail 5A coupled to the cushion side member 15 and a lower rail 5B supporting the upper rail 5A so as to be slidable in the fore and aft direction. The lower rails 5B are connected to the floor via the legs 6. A rail lock device 5C is provided between the lower rails 5B and the upper rails 5A for selectively fixing the position of the upper rails 5A relative to the lower rails 5B.

The seatback 3 includes a seatback frame 20 serving as a skeleton, a seatback pad 21 supported by the seatback frame 20, and a skin member 22 covering the outer surface of the seatback pad 21. The seatback frame 20 includes a pair of back side members 24 extending vertically along either side of the seatback 3, an upper member 25 extending laterally and connected to the upper ends of the back side members 24, and a lower member 26 extending laterally and connected to the lower ends of the back side members 24. The lower ends of the back side members 24 are rotatably connected to the rear ends of the respective cushion side members 15 via a reclining mechanism 28. The reclining mechanism 28 can selectively fix the back side members 24 relative to the cushion side members 15 at a desired angular position.

The back side members 24 each consist of a sheet metal member having a side wall portion 24A extending vertically and having a major plane facing in the lateral direction, a front edge wall portion 24B extending laterally inward (laterally toward the center of the seat 1) from the front edge of the side wall portion 24A, and a rear edge wall portion 24C extending laterally inward from the rear edge of the side wall portion 24A. Thus, each back side member 24 forms a channel member having an open side facing in the laterally inward direction (laterally toward the center of the seat 1).

Figure 3:
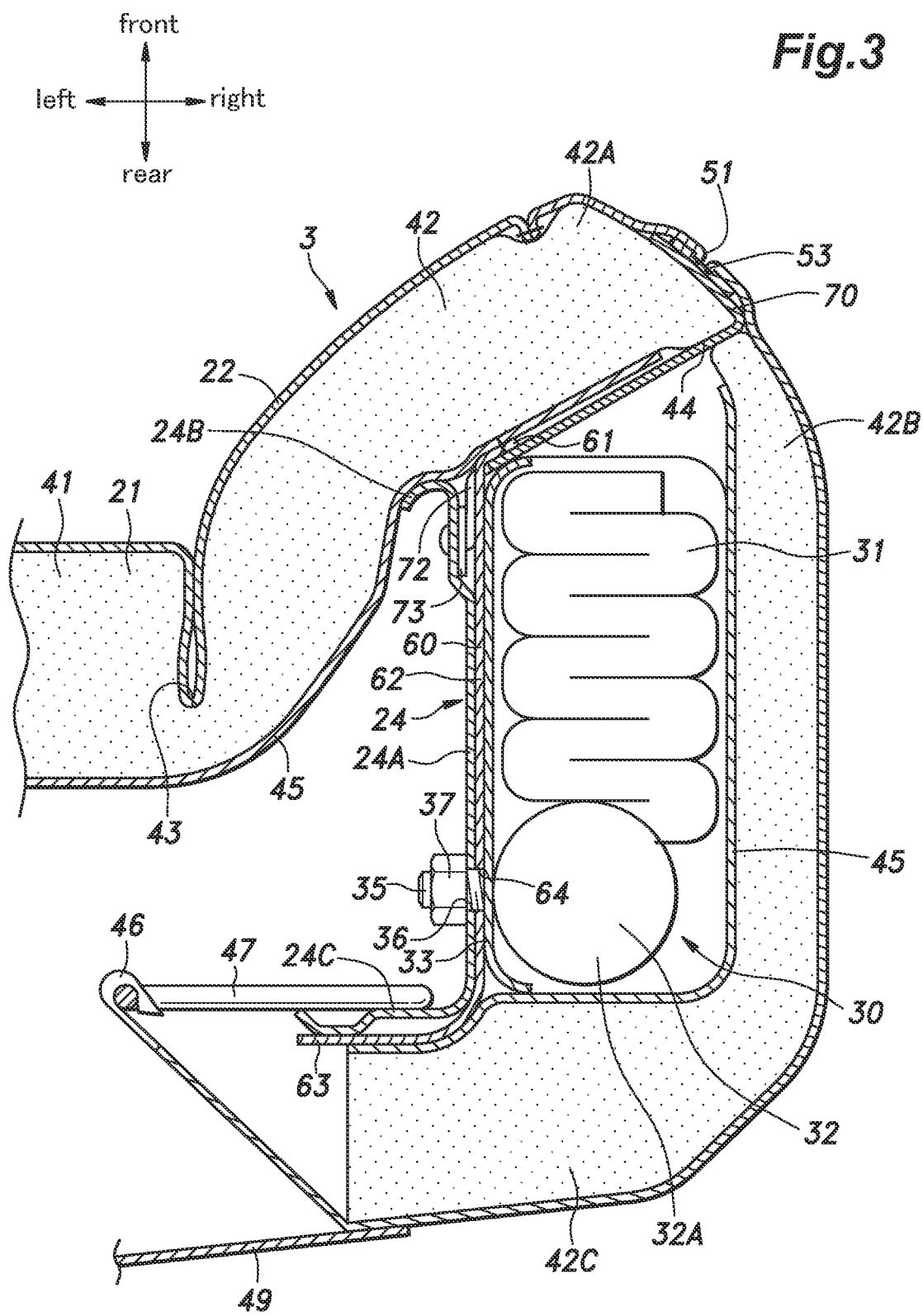
FIG. 3 is a sectional view of a seatback taken along line III-III of FIG. 1.

As shown in FIG. 2, a side airbag unit 30 is provided on the outer surface (surface facing laterally outward) of the side wall portion 24A of the back side member 24 on the right side. As shown in FIG. 3, the side airbag unit 30 includes a side airbag 31 consisting of a fabric bag, an inflator 32 connected to the side airbag 31, and a retainer 33 supporting the inflator 32 and the side airbag 31. The inflator 32 is a device for generating gas to be supplied to the side airbag 31, and has a cylindrical housing 32A. The retainer 33 is formed as a plate member, and is connected to a side surface of the housing 32A. The side airbag 31 is folded in the initial state, and is positioned on one side of the inflator 32 and the retainer 33. The outer shape of the side airbag unit 30 including the inflator 32, the side airbag 31, and the retainer 33 has a substantially rectangular parallelepiped shape, and the retainer 33 defines one of the outer side surfaces thereof.

A fastening shaft 35 is provided on the surface of the retainer 33 facing away from the inflator 32. A fastening hole 36 penetrating in the thickness-wise direction is formed in the side wall portion 24A of the back side member 24 on the right side. The fastening shaft 35 is inserted into the fastening hole 36 and fastened so that the side airbag unit 30 is attached to the outer surface of the side wall portion 24A of the back side member 24. In the present embodiment, the fastening shaft 35 is a stud bolt, and is fastened to the periphery of the fastening hole 36 by threading a nut 37 onto the tip end of the fastening shaft 35 passed through the fastening hole 36. In another embodiment, the fastening shaft 35 may be provided with an expandable claw at the tip thereof so as to be locked to the periphery of the fastening hole 36 at the claw. The side airbag unit 30 is attached to the back side member 24 so that the longitudinal direction of the side airbag unit 30 and the inflator 32 is parallel to the longitudinal direction of the back side member 24.

The inflator 32 is connected to an ECU (not shown in the drawings) of the vehicle so as to generate gas upon receiving a signal from the ECU to deploy the side airbag 31.

The seatback pad 21 is formed of a flexible cushioning material such as polyurethane foam. The seatback pad 21 includes a central part 41 located between the left and right back side members 24, and a pair of side parts 42 connected to the left and right sides of the central part 41, and surrounding the corresponding back side members 24. The central part 41 opposes the upper back of the torso of the seat occupant, and the left and right side parts 42 oppose the respective upper sides of the torso of the seat occupant. Each side part 42 includes a side front part 42A projecting laterally outward and forward from the corresponding side edge of the central part 41, a side end part 42B extending rearward from the outer edge of the side front part 42A along the laterally outer side of the back side member 24 and the side airbag unit 30, and a side rear part 42C extending laterally inward from the rear edge of the side end part 42B to a part located behind the back side member 24. A groove 43 is formed at the boundary between the central part 41 and each of the left and right side parts 42. At the bottom of the groove 43, a listing wire (not shown in the drawings) for tying down the skin member 22 is provided.

A pad side slit 44 is provided in an outer end part of the right back side member 24 of the seatback pad 21 so as to be passed through the seatback pad 21 in the thickness-wise direction and extend substantially in parallel (vertically) with the back side member 24. The pad side slit 44 is disposed so as to oppose the side airbag unit 30. In the present embodiment, the pad side slit 44 is provide in a laterally outward and front part of the back side member 24 on the right side, and is located at the boundary between the side front part 42A and the side end part 42B of the seatback pad 21. The pad side slit 44 is normally maintained in a closed state by the elastic force (shape retaining force) of the seatback pad 21.

A back liner 45 is attached to the back surface of the seatback pad 21. The back liner 45 may be, for example, non-woven fabric or woven fabric. The back liner 45 may be joined to the seatback pad 21, for example, when foam-molding the seatback pad 21. If desired, the back liner 45 may be provided also on the wall surface of the seatback pad 21 defining the pad side slit 44, and may extend to the periphery of the pad side slit 44 on the surface of the seatback pad 21.

The skin member 22 is formed of synthetic leather, cloth or the like. The skin member 22 is put on the seatback pad 21, and fixed to the surface of the seatback pad 21 by being tied down to the listing wire via the groove 43. Further, hooks 46 are provided along the edge of the skin member 22, and are hooked onto a wire 47 consisting of a metal rod provided on the back side member 24 on the right side. A back cover 49 is provided on the back of the seatback 3 to cover the opening formed by the edge of the skin member 22. The back cover 49 is formed of the same material as the skin member 22, and is attached to the edge of the skin member 22 by using traditional fasteners or surface fasteners.

A part of the skin member 22 corresponding to the pad side slit 44 is formed with a skin side slit 51 which is passed through the skin member 22. The skin side slit 51 extends along the pad side slit 44 at a position offset from the pad side slit 44 in the lateral direction by a predetermined distance. In the present embodiment, the skin side slit 51 is offset from the pad side slit 44 by a predetermined distance in the laterally inward direction. The edge of the skin member 22 on the skin side slit 51 is folded back and stitched to form a hem. The edges of the skin member 22 defining the skin side slit 51 are sewn together by a thread 53 so that the opening of the skin side slit 51 is thereby closed. When the seatback pad 21 is covered by the skin member 22, the skin side slit 51 is provided with a linear shape which is elongated vertically.

A retaining sheet 60 for connecting the seatback pad 21 to the back side member 24 is provided on a back side of the seatback 3. The retaining sheet 60 is a sheet member formed of a nonwoven fabric, a woven fabric, or a resin sheet. As shown in FIGS. 3 and 4, the retaining sheet 60 has a pad connecting portion 61 which is located at the front edge thereof and sewn to the back liner 45 of the seatback pad 21, a frame connecting portion 62 which extends in the fore and aft direction with a major plane thereof facing in the lateral direction, and connected to the back side member 24, and a gripping portion 63 extending to the rear of the back side member 24. The retaining sheet 60 progressively increases in the vertical width thereof from the frame connecting portion 62 to the pad connecting portion 61 so that the vertical width of the pad connecting portion 61 is substantially greater than that of the frame connecting portion 62. The frame connecting portion 62 is formed with a sheet hole 64 penetrating in the thickness-wise direction of the retaining sheet 60. The frame connecting portion 62 is formed in a substantially circular shape centering around the sheet hole 64.

As shown in FIG. 3, the pad connecting portion 61 of the retaining sheet 60 is connected to a part of the back liner 45 of the seatback pad 21 corresponding to the front end of the back side member 24 on the right side. More specifically, the pad connecting portion 61 of the retaining sheet 60 is connected to a part of the back liner 45 of the seatback pad 21 adjacent to the front edge wall portion 24B of the back side member 24 on the right side. Preferably, the pad connecting portion 61 of the retaining sheet 60 is connected to a part of the back liner 45 of the seatback pad 21 opposing the front edge wall portion 24B of the right back side member 24 or is connected to a part of the back liner 45 of the seatback pad 21 slightly laterally offset from the front edge wall portion 24B of the right back side member 24.

The pad connecting portion 61 of the retaining sheet 60 is sewn to the back liner 45 of the seatback pad 21. In another embodiment, the pad connecting portion 61 of the retaining sheet 60 is attached to the back liner 45 by bonding or using buttons among other possibilities. The sewn part or the seam between the pad connecting portion 61 and the back liner 45 extends vertically. The pad connecting portion 61 is provided with a greater vertical width than the frame connecting portion 62 so that the retaining sheet 60 can be attached to the back liner 45 with a seam having a relatively large length.

The frame connecting portion 62 of the retaining sheet 60 is disposed between the outer surface of the side wall portion 24A of the back side member 24 and the retainer 33 of the side airbag unit 30, and is held between the back side member 24 and the side airbag unit 30 so that the retaining sheet 60 is securely fixed to the back side member 24. The fastening shaft 35 for fastening the side airbag unit 30 to the back side member 24 is passed through the sheet hole 64 of the frame connecting portion 62, and fixedly secures the frame connecting portion 62 to the back side member 24. Preferably, pad connecting portion 61 and the frame connecting portion 62 of the retaining sheet 60 is taut and have no slack when the frame connecting portion 62 is attached to the back side member 24.

The gripping portion 63 of the retaining sheet 60 projects rearward from between the back side member 24 and the side airbag unit 30. The gripping portion 63 of the retaining sheet 60 is held between the rear edge wall portion 24C of the back side member 24 and the side rear part 42C of the seatback pad 21.

Further, the back side member 24 and the skin member 13 are connected to each other by a stay cloth 70 (or webbing). The stay cloth 70 has a certain vertical width, and extends lengthwise in the lateral direction. One end of the stay cloth 70 in the lengthwise direction is sewn to the edge of the skin member 13 defining the front edge of the skin side slit 51. The other end of the stay cloth 70 in the lengthwise direction is bifurcated into an upper branch 71 and a lower branch 72 located one above the other. The free ends of the upper branch 71 and the lower branch 72 are connected to the back side member 24 via respective clips 73. The stay cloth 70 extends from the back side member 24 along the back liner 45, and then passes through the pad side slit 44 to extend to the front edge of the skin side slit 51.

The connecting part between the upper branch 71 and the back side member 24 is located above the frame connecting portion 62 of the retaining sheet 60, and the connecting part between the lower branch 72 and the back side member 24 is located below the frame connecting portion 62. The retaining sheet 60 extends from the frame connecting portion 62 to the pad connecting portion 61 by passing through the space defined between the upper branch 71 and the lower branch 72.

The mode of operation and effect of the seat 1 configured as described above will be described in the following. As shown in FIG. 5, when the side airbag 31 is deployed, the side airbag 31 inflates along the stay cloth 70 toward the pad side slit 44. By being pushed by the expanding side airbag 31, the seatback pad 21 is deformed in such a manner that the pad side slit 44 opens up. Further, under the pressing force from the inflating side airbag 31, the sewing thread 53 that has kept the skin side slit 51 closed is broken, and the skin side slit 51 opens up. As a result, the side airbag 31 passes through the pad side slit 44 and the skin side slit 51 to be deployed out of the seat 1. Since the seam line (the sewn part) joining the pad connecting portion 61 of the retaining sheet 60 and the back liner 45 together extends vertically, the peripheral part of the pad side slit 44 of the side front part 42A of the seatback pad 21 is allowed to be deformed in an outward (forward) direction around the seam line between the pad connecting portion 61 of the retaining sheet 60 and the back liner 45

At normal times excluding the time when the side airbag 31 is deployed, the seatback pad 21 and the skin member 22 are maintained in a predetermined shape so that the pad side slit 44 is kept in a closed state. When an occupant of the seat 1 comes in contact with the seatback 3, the pad side slit 44 may temporarily open up due to the resulting elastic deformation of the seatback pad 21 and the skin member 22, but once the seatback pad 21 is allowed to restore the original shape thereof, the pad side slit 44 restores the original closed state thereof.

When the seatback pad 21 is deformed under an external force applied by the occupant, the retaining sheet 60 pulls back a part of the back surface of the seatback pad 21 adjoining the back side member 24 so that the movement of the seatback pad 21 relative to the back side member 24 is restricted. Thereby, the positional deviation of the seatback pad 21 with respect to the back side member 24 is minimized. If the seatback pad 21 is displaced excessively relative to the back side member 24, the seatback pad 21 could be caught by the back side member 24, and this may prevent the seatback pad 21 from restoring the original shape. The retaining sheet 60 prevents such an excessive displacement of the seatback pad 21 with respect to the back side member 24 so that the seatback pad 21 can be reliably restored to the initial form after being elastically deformed. As a result, the likelihood of the skin side slit 51 and the pad side slit 44 to be kept open can be minimized.

Since the retaining sheet 60 extends from the front end connected to the back surface of the seatback pad 21 rearward between the back side member 24 and the side airbag unit 30, the deployment of the side airbag 31 is in no way hindered by the presence of the retaining sheet 60.

The gripping portion 63 provided at the rear end of the retaining sheet 60 facilitates the assembly work of the seat 1. The worker can place the retaining sheet 60 at an appropriate position with respect to the back side member 24 by pulling the gripping portion 63 of the retaining sheet 60 after putting the seatback pad 21 on the seatback frame 20. Thereafter, the worker inserts the fastening shaft 35 of the side airbag unit 30 into the sheet hole 64 and the fastening hole 36 while holding the retaining sheet 60 by the gripping portion 63 thereof to fixedly secure the retaining sheet 60 and the side airbag unit 30 to the back side member 24.

The present invention has been described in terms of a specific embodiment, but is not limited by such an embodiment, and can be modified in various ways without departing from the spirit of the present invention. The pad side slit 44 was provided at the boundary between the side front part 42A and the side end part 42B of the seatback pad 21, but the pad side slit 44 may also be provided in the side end part 42B of the seatback pad 21 as shown in FIG. 6. The pad side slit 44 may be provided opposite to the front edge of the side airbag unit 30, and the skin side slit 51 may be provided at a position squarely opposite to the pad side slit 44.

Further, as shown in FIG. 6, the connecting portion (seam) between the pad connecting portion 61 of the retaining sheet 60 and the back liner 45 may overlap with or squarely oppose the front edge wall portion 24B of the back side member 24 in the fore and aft direction.

The frame connecting portion 62 of the retaining sheet 60 may be connected to the back side member 24 above or below the side airbag unit 30.

Glossary of Terms

1: seat
2: seat cushion
3: seatback
20: seatback frame
21: seatback pad
22: skin member
24: back side member
24A: side wall portion
24B: front edge wall portion
24C: rear edge wall portion
30: side airbag unit
31: side airbag
32: inflator
32A: housing
33: retainer
35: fastening shaft
36: fastening hole
37: nut
42: side part
42A: side front part
42A: side end part
44: pad side slit
45: back liner
51: skin side slit
60: retaining sheet
61: pad connecting portion
62: frame connecting portion
63: gripping portion
64: sheet hole
70: stay cloth

The invention claimed is:

1. A vehicle seat comprising a seat cushion and a seatback, the seat comprising:
   a seatback frame including a right and a left side member extending vertically;
   a side airbag unit including an inflator and attached to one of the side members;
   a flexible seatback pad supported by the seatback frame and covering the side members and the side airbag unit;
   a skin member covering an outer surface of the seatback pad; and
   a retaining sheet bonded to the seatback pad and connected to the side member,
   wherein the retaining sheet has a pad connection portion bonded to the seatback pad and positioned forward of the side member and the side airbag unit.

2. The vehicle seat according to claim 1, wherein a back liner is attached to the seatback pad, and the retaining sheet is bonded to the seatback pad via the back liner.

3. The vehicle seat according to claim 1, wherein the pad connection portion is bonded to a part of the seatback pad located laterally outward of the side member.

4. The vehicle seat according to claim 1, wherein the retaining sheet has a greater vertical width in a part thereof connected to the seatback pad than in a part thereof connected to the side member.

5. The vehicle seat according to claim 1, wherein the seatback pad is provided with a pad side slit passed through a part of the seatback pad opposing the side airbag unit in a thickness-wise direction and extending substantially in parallel with the side member to permit an airbag deployed from the side airbag unit to pass through,
   the skin member has a skin side slit in a part thereof corresponding to the pad side slit, and
   the pad connecting portion is positioned inside the pad side slit.

6. The vehicle seat according to claim 1, wherein the pad connecting portion is bonded to a part of a back side of the seatback pad.

7. The vehicle seat according to claim 1, wherein the pad connecting portion is bonded to the seatback pad on the center side of the seatback, rather than the center of the inflator in the lateral direction.

8. The vehicle seat according to claim 1, wherein the seatback pad has a groove for tying down the skin member,
   the pad connecting portion is positioned forward of the groove and the retaining sheet extends from the pad connecting portion to rearward of the groove.

9. The vehicle seat according to claim 1, wherein the seatback pad includes a central part located between the left and right side members, and a pair of side parts connected to the left and right sides of the central part,
   each side part includes a side front part projecting laterally outward and forward from the corresponding side edge of the central part,
   the pad connecting portion is bonded to a part of a back side of the side front part.

10. A method for making a vehicle seat comprising a seat cushion and a seatback, the method comprising:
    preparing a seatback frame including a right and a left side member extending vertically;
    attaching a side airbag unit including an inflator to one of the side members;
    covering the side members and the side airbag unit with a flexible seatback pad;
    bonding a retaining sheet to the seatback pad and connecting the retaining sheet to the side member; and
    covering an outer surface of the seatback pad with a skin member,
    wherein the retaining sheet has a pad connecting portion bonded to the seatback pad and positioned forward of the side member and the side airbag unit.

11. The method according to claim 10, the method further comprising attaching a back liner to the seatback pad,
    wherein the retaining sheet is bonded to the seatback pad via the back liner.

12. The method according to claim 10, wherein the retaining sheet is bonded to a part of the seatback pad located laterally outward of the side member.

13. The method according to claim 10, wherein the retaining sheet has a greater vertical width in a part thereof connected to the seatback pad than in a part thereof connected to the side member.

14. The method according to claim 10, wherein the seatback pad is provided with a pad side slit passed through a part of the seatback pad opposing the side airbag unit in a thickness-wise direction and extending substantially in parallel with the side member to permit an airbag deployed from the side airbag unit to pass through,
    the skin member has a skin side slit in a part thereof corresponding to the pad side slit, and
    the pad connecting portion is positioned inside the pad side slit.

15. The method according to claim 10, wherein the pad connecting portion is bonded to a part of a back side of the seatback pad.

16. The method according to claim 10, wherein the pad connecting portion is bonded to the seatback pad on the center side of the seatback, rather than the center of the inflator in the lateral direction.

17. The method according to claim 10, wherein the seatback pad has a groove for tying down the skin member,
    the pad connecting portion is positioned forward of the groove and the retaining sheet extends from the pad connecting portion to rearward of the groove.

18. The method according to claim 10, wherein the seatback pad includes a central part located between the left and right side members, and a pair of side parts connected to the left and right sides of the central part,
    each side part includes a side front part projecting laterally outward and forward from the corresponding side edge of the central part,
    the pad connecting portion is bonded to a part of a back side of the side front part.

* * * * *